United States Patent
Ochiai

(12) 
(10) Patent No.: US 6,269,249 B1
(45) Date of Patent: *Jul. 31, 2001

(54) PAGER AND METHOD FOR CALLING THE SAME

(75) Inventor: Kensaku Ochiai, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,347

(22) Filed: Jun. 9, 1998

(30) Foreign Application Priority Data

Jun. 10, 1997 (JP) .............................. P09-152330

(51) Int. Cl.[7] ...................................... H04Q 7/20
(52) U.S. Cl. .......................... 455/519; 455/458; 340/7.46
(58) Field of Search .................. 455/31.2, 458, 455/31.3, 32.1, 38.1, 519; 340/825.44, 825.22

(56) References Cited

U.S. PATENT DOCUMENTS

| | | | | |
|---|---|---|---|---|
| 4,649,538 | * | 3/1987 | DeLuca et al. | 371/25 |
| 5,345,227 | * | 9/1994 | Fascenda et al. | 340/825.44 |
| 5,473,667 | * | 12/1995 | Neustein | 340/825.44 |

* cited by examiner

*Primary Examiner*—Lee Nguyen
(74) *Attorney, Agent, or Firm*—Jay H. Maioli

(57) ABSTRACT

A pager and a pager calling method for allowing a caller to select a desired combination of pagers to be called. The pager includes a microcomputer, an antenna, a receiving circuit, an LED, a ringing tone generating circuit, a sounder, an LCD and operation keys. The microcomputer including a CPU is connected to an ID-ROM storing sub-addresses specific to individual pagers. Upon receipt of a message by the receiving circuit, the microcomputer checks to see if the message has a sub-address corresponding to any of the sub-addresses in the ID-ROM of the pager. In case of a sub-address match, the pager in question notifies its user of the incoming message by activating the LCD and the sounder.

3 Claims, 3 Drawing Sheets

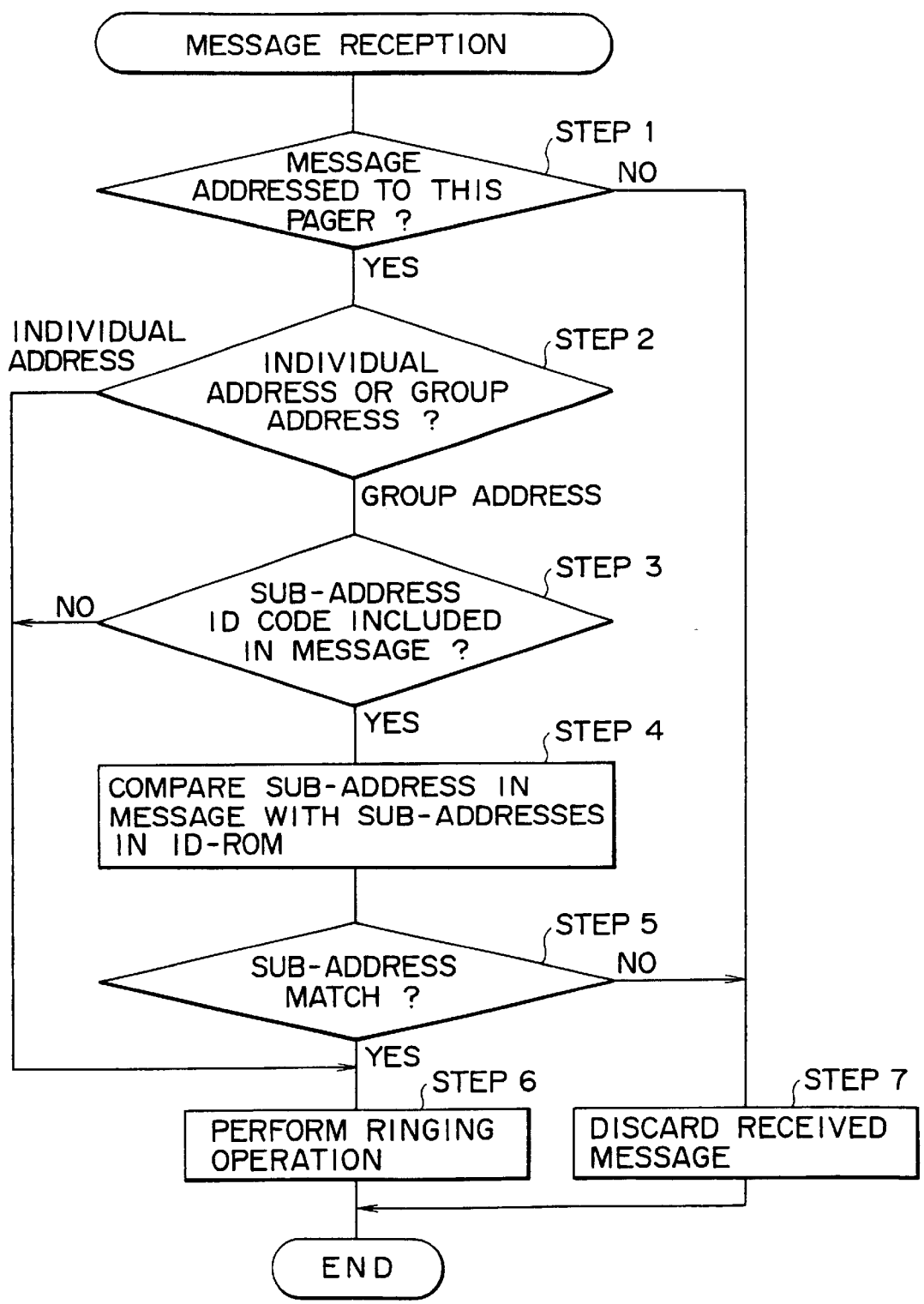

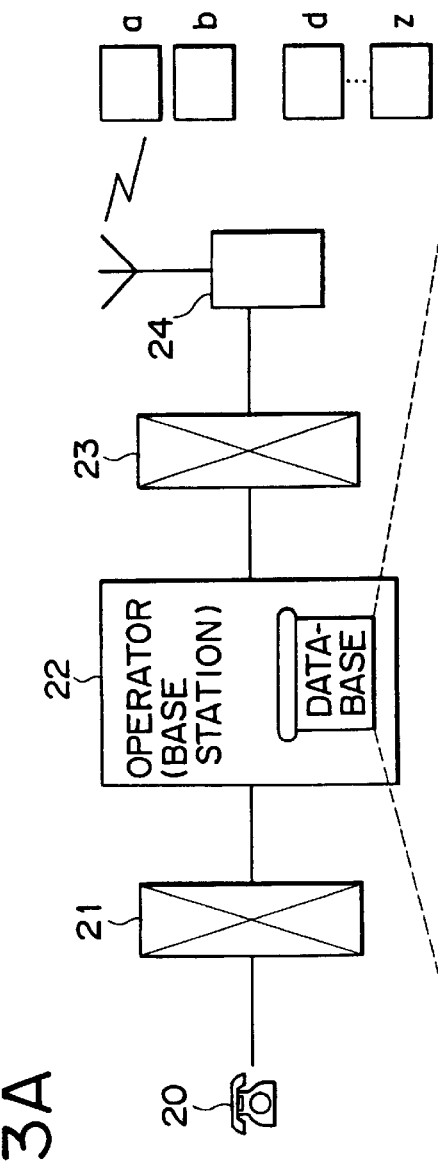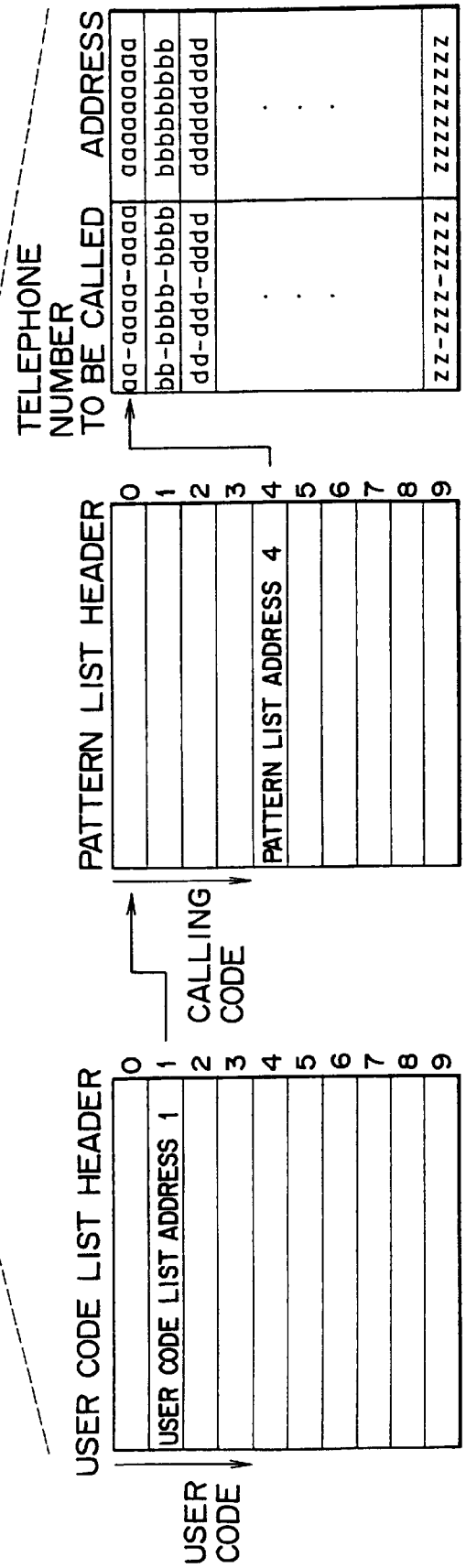

PAGER AND METHOD FOR CALLING THE SAME

BACKGROUND OF THE INVENTION

1. Field of the Invention

The present invention relates to a pager for receiving messages and a method for calling the pager. More particularly, the invention relates to pagers carried by a plurality of users and a method for transmitting the same message to such pagers.

2. Description of the Related Art

Pagers have gained widespread use in recent years as means of communication for exchanging desired messages (via operators). Pagers may illustratively have a group calling function whereby the same message is transmitted to a plurality of users carrying the same type of pagers. The function is convenient for a group of people communicating with one another through message transmissions.

For a group of users to make use of the group calling function, it is necessary for the users first to purchase a set of pagers and then to write a group address to each of the pagers so that they may be called up simultaneously. A single message transmission calls up all pagers in the group. This can be a disadvantage to some users. That is, those to whom a given message is not relevant must necessarily be called up and receive the message as well.

Message transmissions with different contents are by nature addressed to different combinations of receivers. Even within the same group, transmissions may not always take place to the same combination of users all the time. However, attempts to send the same message to each of individual users concerned in the group are time-consuming and can run up telephone charges. A need has thus been recognized for a group calling method for designating a specific group of message receivers depending on the contents of messages.

SUMMARY OF THE INVENTION

It is therefore an object of the present invention to provide a pager and a pager calling method intended to eliminate the ordinary inability of a caller to designate a desired combination of pager carriers who need to receive the message in question.

The above and other objects, features and advantages of the invention will become more apparent upon a reading of the following description and appended drawings.

BRIEF DESCRIPTION OF THE DRAWINGS

FIG. 2 is a flowchart of steps constituting a sub-address identifying routine of the first embodiment;

FIG. 3A is a conceptual block diagram of a pager practiced as a second embodiment of the invention;

FIG. 3B is a user code list for the second embodiment;

FIG. 3C is a calling code list for the second embodiment; and

FIG. 3D is a pattern list for the second embodiment.

DESCRIPTION OF THE PREFERRED EMBODIMENTS

Figure 1:
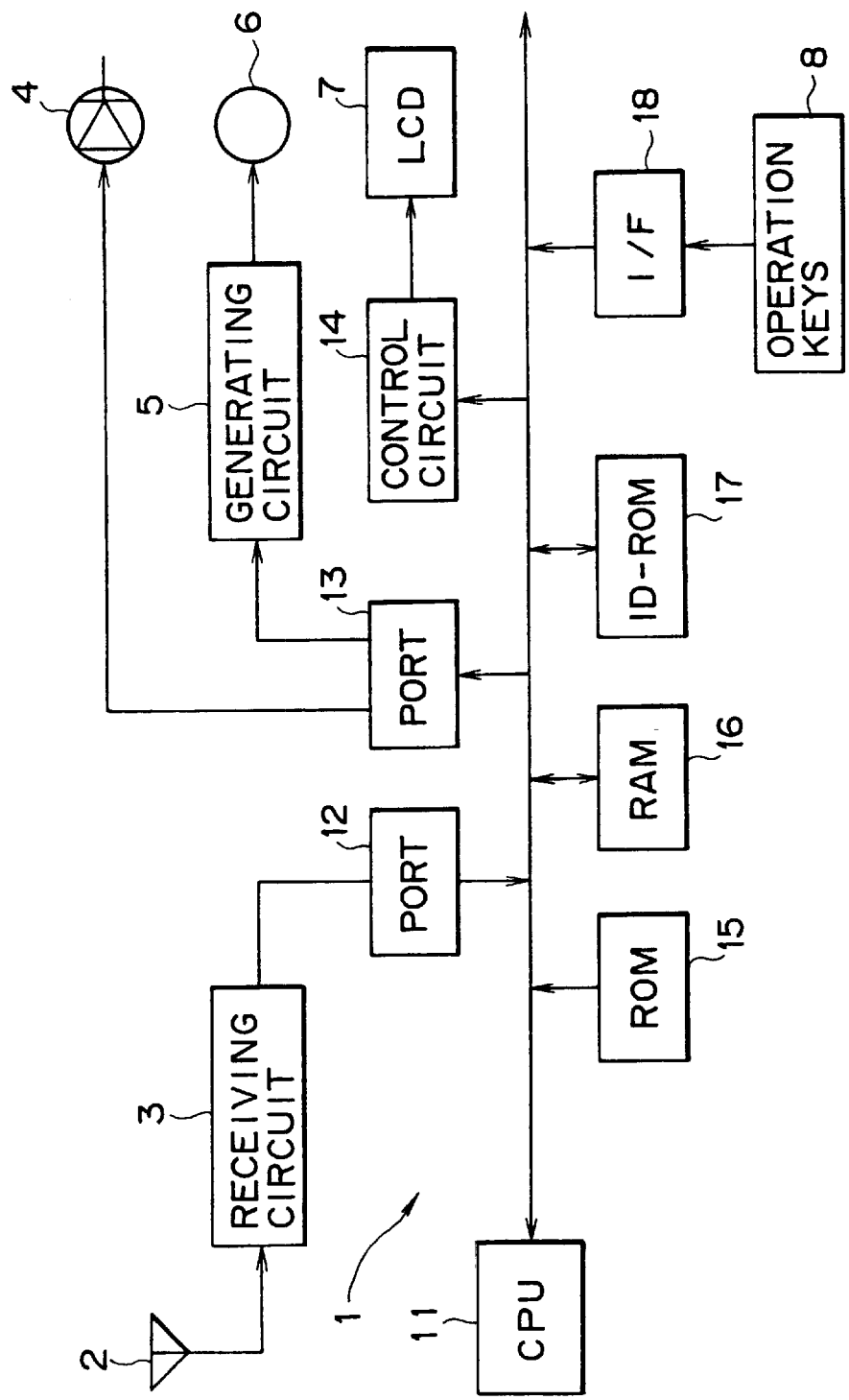
FIG. 1 is a block circuit diagram of a pager practiced as a first embodiment of the invention.

Preferred embodiments of the present invention will now be described with reference to the accompanying drawings.

A typical circuit constitution of a pager embodying the invention will now be described with reference to FIG. 1 illustrating a block circuit diagram of the pager.

As shown in FIG. 1, the pager comprises a microcomputer 1, an antenna 2 and a receiving circuit 3 each connected to the microcomputer 1, a light-emitting diode (LED) 4, a ringing tone generating circuit 5, a sounder 6 such as a speaker or a piezo-electric device, a liquid crystal panel (LCD) 7, and operation keys 8.

The microcomputer 1 includes a CPU 11 illustratively made of a microprocessor, a port 12 connected to the receiving circuit 3 via a bus line extended from the CPU 11, a port 13 connected to both the LED 4 and the generating circuit 5, a control circuit 14 for controlling the LCD 7, a ROM 15, a RAM 16, an ID-ROM 17, and an interface (I/F) 18 connected to the operation keys 8.

How the pager of the above constitution works will now be described. The receiving circuit 3 has a superheterodyne structure, not shown, ranging from an antenna input circuit to a binary or a four-value FSK (frequency-shift keying) demodulating circuit. When a message whose address matches the own address in the ID-ROM 17 is received from an operator (i.e., base station), an identifier and related data are retrieved from the receiving circuit 3. The retrieved identifier and data are supplied to the microcomputer 1.

The microcomputer 1 collates the received data with the data specific to the pager and held in the ID-ROM 17. Specifically, a check is made to see if the identifier fed to the microcomputer 1 is suffixed with a sub-address specific to this pager. If the matching sub-address is found to be included, an output signal of the port 13 is sent to the LED 4 and the ringing tone generating circuit 5.

Given the output signal, the LED 4 informs by light the pager carrier that the pager is being called. On receiving the output signal, the generating circuit 5 generates a ringing tone that is output by the sounder 6.

The ROM 15 connected to the CPU 11 contains various processing programs including a processing program according to this invention (details of the program are described later). The RAM 16 provides the CPU 1 with a work area that accommodates data in messages received and stored by this pager.

The CPU 11 carries out various programs in the ROM 15, recognizes via the interface 18 what is designated by the operation keys 8, and performs necessary controls. The message data received by the receiving circuit 3 are converted to character data by the CPU 11 and fed to the control circuit 14.

The control circuit 14 converts the received character data into display data for display onto the LCD 7. The LCD 7 displays a message (i.e., character information) corresponding to the display data. The received data are saved in the RAM 16, allowing the message to be invoked repeatedly as needed on the LCD 7 by operation of the operation keys 8. In the manner described, the user notices the message coming into his or her pager and may visually check the message displayed on the LCD 7.

Variations of the pager calling method of this invention will now be described.

First Embodiment

The first embodiment of the pager calling method according to the invention is described below with reference to FIGS. 1 and 2. FIG. 2 is a flowchart of steps constituting a sub-address identifying routine of the first embodiment. The routine of FIG. 2 is activated when the CPU is informed by the receiving circuit of the receipt of a message via an interrupt port or other appropriate component.

The main feature of the first embodiment involves furnishing pagers each having a group address with sub-addresses. The sub-addresses may be designated selectively at,the time of message transmission, whereby the combination of pagers to be called is varied. The procedures making up this routine are outlined below.

Procedure 1: The ID-ROM 17 (see FIG. 1) in each of the pagers having the same group address is set with a sub-address typically composed of one digit.

Procedure 2: A caller first dials the telephone number corresponding to the group address and then inputs a message including one or a plurality of sub-addresses following a sub-address identifier of the group address. Where a plurality of sub-addresses are designated, each sub-address string is prefixed and suffixed by a sub-address identifier. A typical sub-address identifier may be given by dialing a symbol "★" combined with a one-digit number.

Procedure 3: Each pager called up by its own group address checks to see if the received message contains any sub-address identifier. If a sub-address identifier is detected, a check is made to see if the received sub-address matches the pager's own sub-address. In case of a sub-address match, the pager performs a ringing operation to draw the attention of its user. In case of a mismatch, the received message is discarded.

More specifically, in step 1 of FIG. 2, a check is made to see if the address in the received message matches any of a plurality of addresses in the ID-ROM 17. In case of a mismatch, step 7 is reached in which the received message is discarded, and the processing is terminated. If there is a matching sub-address, step 2 is reached. The judgment in step 1 is usually carried out by a decoder block (not shown) in the receiving circuit 3. In that case, step 1 may be omitted from the routine.

In step 2, a check is made to see if the address in the received message is an individual address specific to a given pager or a group address attached to the pagers making up a group. If the address in the message is found to be an individual address specific to this pager, step 6 is reached unconditionally in which a ringing operation is carried out. If the received address is judged to be the group address, step 3 is reached.

In step 3, a check is made to see if the received message includes sub-address information. If no sub-address information is detected, step 6 is reached in which a ringing operation is performed. If sub-address information is detected, step 4 is reached.

In step 4, the sub-address in the received message is compared with the sub-addresses in the ID-ROM 17. In step 5, a check is made to see if any of the sub-addresses in the ID-ROM 17 matches the received sub-address. In case of a match, step 6 is reached in which a ringing operation is performed and then the processing is brought to an end. In case of a sub-address mismatch, step 7 is reached in which the received message is discarded and the processing is ended. The judgment on the presence or absence of sub-address information in step 4 is made by verifying whether any of the identifiers in the ID-ROM 17 is contained in the received message. Suppose that a number flanked by symbols "-[" and "]-" represents sub-addresses. In that case, if a number -[135]- is found in the message, the message is destined for the pagers with sub-addresses 1, 3 and 5.

Second Embodiment

The second embodiment of the pager calling method according to the invention involves registering a pattern list of destination pagers with the operator, whereby the combination of pagers to be called is varied as needed. How the second embodiment is implemented is described below with reference to FIGS. 3A through 3D. FIG. 3A is a conceptual block diagram of a pager practiced as the second embodiment of the invention. FIGS. 3B, 3C and 3D are a user code list, a calling code list, and a pattern list. respectively for the second embodiment. The procedures making up the second embodiment are outlined below.

Procedure 1: A caller 20 in FIG. 3A connects to an operator 22 (i.e., base station) via a switching system 21. Given guidance or like assistance from the operator, the caller inputs his or her own user code (see FIG. 3B) made of some 10 numerical digits and a password number of some four digits.

Procedure 2: The operator 22 verifies the identity of the user based on the input user code and password number. With the user's identity authenticated, the operator 22 furnishes operational guidance prompting the user to input a calling code identifier, a calling code of one or two digits (see FIG. 3C), and a message to be transmitted. A typical calling code identifier may be input by dialing a symbol "★" combined with a one-digit number. A user code list header, to be determined by the dialed user code, may be one which complies with ordinary database access logic.

Procedure 3: Through a switching system 23 and a transmitter 24, the operator 22 transmits the input message to the pagers a, b, d, . . . , z according to the pattern list (see FIG. 3D) that corresponds to the matching user code and calling code stored in the database of the operator 22.

Where POCSAG type pagers are employed, the transmitter 24 transmits a message to each of individual addresses contained in a given list. Where FLEX or FLEX-TD type pagers are utilized, the transmitter 24 supplies a temporary address to listed pagers desired by means of an air interface and transmits a message simultaneously to that temporary address representing the pagers.

The pattern list shown in FIG. 3D may have its contents altered as needed or verified by the user calling up the operator 22 and performing a dialing operation in accordance with the operator's guidance. Individual pagers on a given pattern list are typically identified by use of each pager's telephone number to be called. Once the identification codes of the pager involved such as their user codes and calling codes have been registered with the operator, a caller need only designate ID codes to send messages to any pagers of his or her choice.

As described and according to the invention, the inventive pager and pager calling method allow a caller to send a message to any combination of pagers desired. That is, the caller may select different pagers to which to transmit any one of different messages.

Although the description above contains many specificities, these should not be construed as limiting the scope of the invention but as merely providing illustrations of the presently preferred embodiments of this invention. Changes and variations of the invention may be made without departing from the spirit or scope of the claims that follow. For example, the invention embodied above as a pager and a pager calling method also applies to the portable phone, personal handyphone system (PHS), portable personal computer, and a soon-to-be-developed portable data terminal combining a personal digital assistant (PDA) with a pager.

Thus the scope of the invention should be determined by the appended claims and their legal equivalents, rather than by the examples given.

What is claimed is:

1. A pager of a plurality of pagers called by an operator upon receipt of a calling signal from a caller, said pager comprising:

means for receiving a message transmitted by the operator, where the operator selects the pager for transmission based on a calling code identifier included in the message received by the operator in the calling signal, with said calling code identifier in the message corresponding to a calling code identifier registered with the operator designating a respective pattern list containing phone numbers of groups of said plurality of pagers to be called including the pager of the plurality of pagers and where said calling code identifier and pattern lists are modifiable by the caller using said calling signal;

means for displaying the message transmitted to the pager;

and means for storing the message for later retrieval by a user of the pager.

2. A pager calling method for calling a plurality of pagers simultaneously upon receipt of a calling signal from a caller, the method comprising the steps of:

registering with an operator a plurality of calling code identifiers for designating respective pattern lists containing phone numbers of groups of said plurality of pagers, said pattern lists being registered with said operator;

allowing the caller to modify said plurality of calling code identifiers and pattern lists registered with said operator via said calling signal;

inputting a message including one of said plurality of calling code identifiers for identifying groups of pagers to be called via said operator;

upon input to said operator of said message including said calling code identifier, selecting phone numbers of pagers matching said calling code identifier registered beforehand with said operator and transmitting said message to said selected pagers displaying said message only on said selected pagers; and storing said message in said selected pagers for later viewing by respective users of said selected pagers.

3. A central operator unit for calling a plurality of pagers simultaneously upon receipt of a calling signal from a caller, said central operator unit comprising:

means for allowing the caller to register a plurality of calling code identifiers for designating respective pattern lists containing phone numbers of groups of said plurality of pagers to be called;

means for allowing the caller to modify said plurality of calling code identifiers and pattern lists registered with said central operator unit via said calling signal;

means for inputting a message including one of said plurality of calling code identifiers for identifying groups of pagers to be called by the central operator unit; and means for selecting phone numbers of pagers matching the calling code identifier included in the message and transmitting said message to said selected pagers.

* * * * *